(12) United States Patent
Moulsley

(10) Patent No.: US 9,894,643 B2
(45) Date of Patent: Feb. 13, 2018

(54) METHOD FOR ALLOCATING TRANSMISSION RESOURCES IN A TELECOMMUNICATION SYSTEM

(75) Inventor: Timothy J. Moulsley, Caterham (GB)

(73) Assignee: KONINKLIJKE PHILIPS N.V., Eindhoven (NL)

(*) Notice: Subject to any disclaimer, the term of this patent is extended or adjusted under 35 U.S.C. 154(b) by 106 days.

(21) Appl. No.: 12/992,114

(22) PCT Filed: May 11, 2009

(86) PCT No.: PCT/IB2009/051930
§ 371 (c)(1),
(2), (4) Date: Nov. 11, 2010

(87) PCT Pub. No.: WO2009/138944
PCT Pub. Date: Nov. 19, 2009

(65) Prior Publication Data
US 2011/0065445 A1    Mar. 17, 2011

(30) Foreign Application Priority Data
May 16, 2008 (EP) .................................. 08305175

(51) Int. Cl.
*H04W 72/00* (2009.01)
*H04W 72/04* (2009.01)
(Continued)

(52) U.S. Cl.
CPC .......... *H04W 72/042* (2013.01); *H04W 24/10* (2013.01); *H04W 72/02* (2013.01);
(Continued)

(58) Field of Classification Search
CPC ... H04W 24/10; H04W 72/04; H04W 72/042; H04W 72/0413
(Continued)

(56) References Cited

U.S. PATENT DOCUMENTS 7,640,373 B2 * 12/2009 Cudak ................... H04L 1/0009
455/70
2005/0191965 A1 * 9/2005 Yu et al. ..................... 455/67.16
(Continued)

FOREIGN PATENT DOCUMENTS

JP        2007181094 A    7/2007
WO       2008149979 A1   12/2008

OTHER PUBLICATIONS

Texas Instruments: "CQI Reporting on Pusch" 3GPP TSG RAN WG1 53, R1-081995, May 2008, 4 Page Document.

*Primary Examiner* — Charles Appiah
*Assistant Examiner* — Jaime Holliday

(57) ABSTRACT

The invention relates to a method for allocating resources for transmissions from a secondary station to a primary station, wherein the primary station transmits to the secondary station a first indication of a transmission resource for use by the secondary station for transmitting data to the primary station, wherein the indication of the transmission resource indicates at least one selected transmission resource out of a set of transmission resources and further comprises a second indication which may request that the secondary station sends a report of the downlink channel quality using at least part of the selected transmission resource and that a time offset of the selected transmission resource from the first indication depends on whether the second indication requests a channel quality report.

19 Claims, 1 Drawing Sheet

(51) Int. Cl.
*H04W 24/10* (2009.01)
*H04W 72/02* (2009.01)
*H04W 72/08* (2009.01)

(52) U.S. Cl.
CPC ........ *H04W 72/04* (2013.01); *H04W 72/0413* (2013.01); *H04W 72/085* (2013.01)

(58) Field of Classification Search
USPC .................................... 455/422.1, 450–453
See application file for complete search history.

(56) References Cited

U.S. PATENT DOCUMENTS

| | | | |
|---|---|---|---|
| 2005/0233754 A1* | 10/2005 | Beale ........................ | 455/452.2 |
| 2007/0254595 A1* | 11/2007 | Yoon .................... | H04L 5/0057 |
| | | | 455/67.14 |
| 2009/0147869 A1* | 6/2009 | Duan et al. ................... | 375/260 |
| 2009/0175232 A1* | 7/2009 | Kolding ........................ | 370/329 |
| 2009/0203383 A1* | 8/2009 | Shen et al. .................... | 455/450 |
| 2009/0213818 A1* | 8/2009 | Park ................. | H04W 74/0833 |
| | | | 370/336 |
| 2009/0238121 A1* | 9/2009 | Kotecha ............... | H04L 1/0026 |
| | | | 370/329 |
| 2010/0105402 A1* | 4/2010 | Chun et al. ................... | 455/450 |
| 2010/0113057 A1* | 5/2010 | Englund et al. ........... | 455/452.1 |
| 2014/0198759 A1 | 7/2014 | Aiba et al. | |

\* cited by examiner

METHOD FOR ALLOCATING TRANSMISSION RESOURCES IN A TELECOMMUNICATION SYSTEM

FIELD OF THE INVENTION

The present invention relates to a method for allocating transmission resources in a telecommunication system, a system of telecommunication using this method, a primary station and a secondary station using the same method. More specifically, this invention is, for example, relevant for a mobile telecommunication system like a UMTS (Universal Mobile Telecommunications System).

BACKGROUND OF THE INVENTION

As defined in the UMTS specifications, the UMTS Terrestrial Radio Access Network (or UTRAN), which is responsible for handling all radio related functionality and which comprises a plurality of base stations (also called NodeB or primary stations), is linked to the user terminals (also called user equipments or secondary stations or mobile stations). The structure of the state of the art UTRA (Evolved Universal Terrestrial Network or E-UTRA, also known as LTE for Long Term Evolution) is captured 3GPP TS36.300, which is available from http://www.3gpp.org, incorporated herein by reference.

Regarding the uplink channels, i.e. from the secondary stations to the base stations, the secondary stations are transmitting data only on respective transmission resources, to avoid collisions of signals. These transmission resources are defined mainly by a frequency, a modulation coding scheme (MCS) and a transmission time interval during which they are allowed to transmit by using those parameters.

This can be done dynamically by sending on a downlink control channel, namely the Layer 1/Layer 2 downlink control channel (or L1/L2 control channel), an indication signal for allocation of an uplink physical resource, for instance in response to an allocation request of the secondary station. The Transmission Time Interval TTI is indicated by the time of transmission of this indication from the primary station to the secondary station: the allocated TTI will start after a fixed period starting from the sending of the indication signal. In this case, the timing of the transmission will be a fixed time period offset from the reception and decoding of the L1/L2 downlink control information.

As currently specified in UMTS LTE, the message that allocates the uplink resource also includes an indication requesting that the User Equipment sends a report on the quality of the down link channel (CQI or Channel Quality Indicator).

SUMMARY OF THE INVENTION

It is an object of the invention to propose a method for allocating uplink resources for data transmission and reporting channel quality information in a way that minimises the time delay between the message allocating the resource and the uplink transmission.

To this end, in accordance with the invention it is proposed a method for allocating resources for transmissions from a secondary station to a primary station, wherein the primary station transmits to the secondary station a first indication of a transmission resource for use by the secondary station for transmitting data to the primary station, wherein the indication of the transmission resource indicates at least one selected transmission resource out of a set of transmission resources and further comprises a second indication which may request that the secondary station sends a report of the downlink channel quality using at least part of the selected transmission resource and that a time offset from the first indication depends on whether the second indication requests a channel quality report.

As a consequence, the primary station can assign a TTI such that the secondary station is granted uplink resources where the time offset between the first indication and the selected resource is greater when primary station requests a channel quality report than when it does not. This means that in the case that primary station requests a channel quality report the secondary station has sufficient time between the first indication and the selected resource to make the necessary channel quality measurement, so that the channel quality report can be included in the uplink transmission using the selected resource.

The present invention also relates to a primary station comprising means for carrying the method in accordance with the invention.

According to another aspect of the invention, it is proposed a secondary station comprising means for carrying out the method in accordance with the first aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
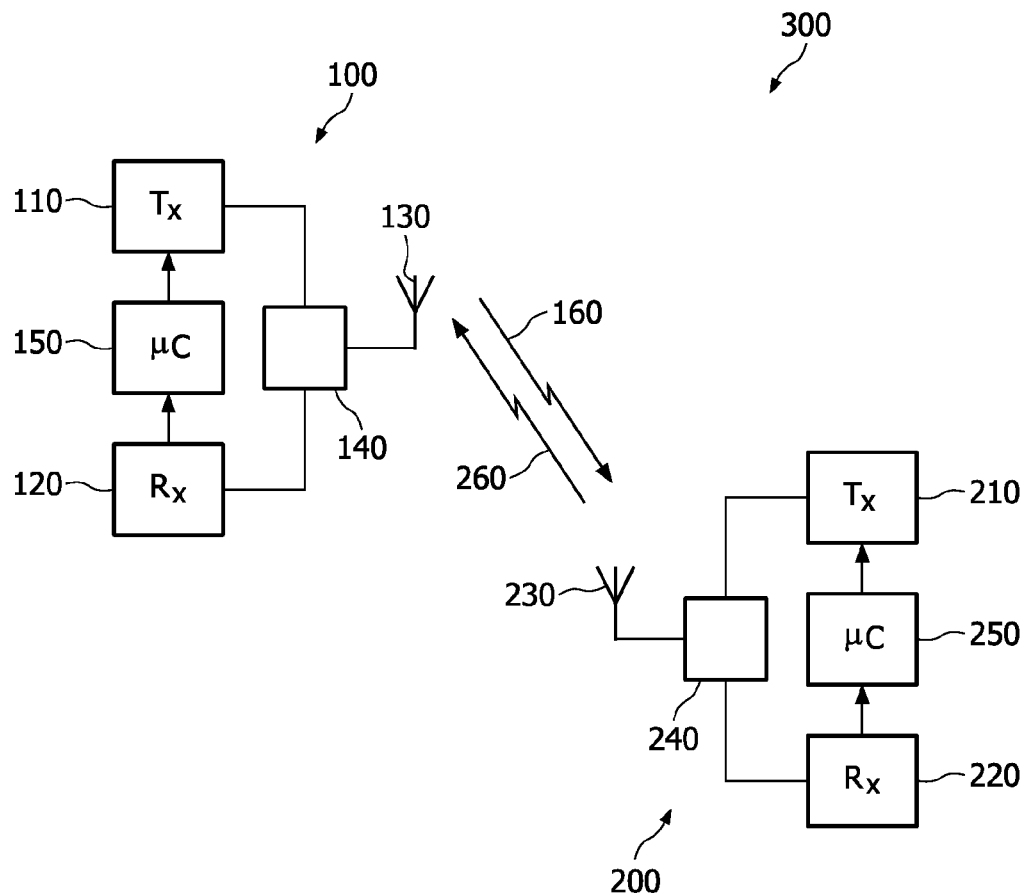
FIG. 1 is a block diagram of a system comprising a primary station and a secondary in accordance with the invention.

The present invention relates to a system of communication 300 as depicted in FIG. 1, comprising a primary station 100, like a base station, and at least one secondary station 200 like a mobile station.

The radio system 300 may comprise a plurality of the primary stations 100 and/or a plurality of secondary stations 200 (also noted UE for User Equipment). The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the first radio station 100 takes place on a second channel 260.

In the uplink the UE has to monitor the L1/L2 control information to decode and detect if its own Cell Radio Network Temporary Identity (an address for identifying all secondary stations within a cell, noted C-RNTI) is present. This is required because when the network allocates Uplink UL resources it typically sends a Resource Allocation RA on the L1/L2 downlink control channels: the default allocation of time and frequency resource (if there is one) may be overridden by a new allocation signalled in the L1/L2 control channel, or the L1/L2 control channel may be used to schedule uplink resources in response to a request from the UE.

The resource allocation typically contains an indication of the frequency resource and the Modulation Coding Scheme MCS that the UE should use for the uplink transmission. The timing of the transmission will be a fixed time period offset from the reception and decoding of the L1/L2 downlink control information.

Figure 2:
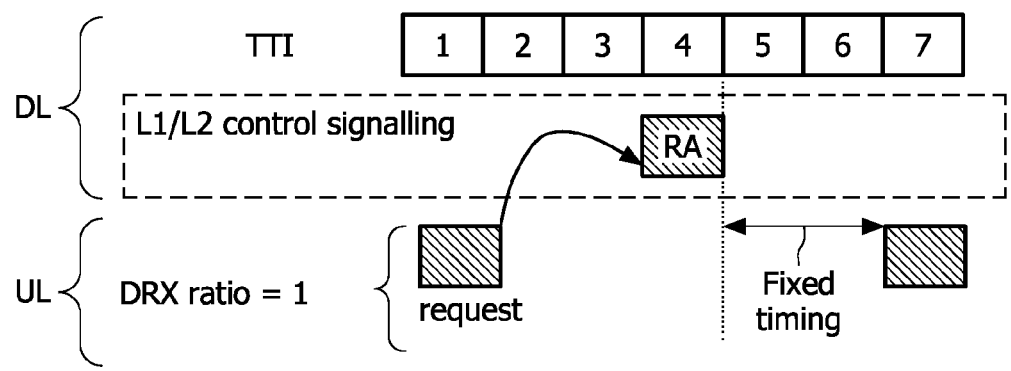
FIG. 2 is a time chart representing the signals transmitted in accordance with a conventional method.

As illustrated on FIG. 2, the secondary station 200 signals a request for uplink resources with the data in the 'request' labelled packet. This request is received by a primary station which will decide when to send a L1/L2 control signal back to the secondary station 200. The timing of this signal is determined by the network, knowing that the secondary station will use a specific time slot defined by a fixed offset from the point at when the secondary station receives and decodes the control signalling. This offset may be a predefined offset, or may be signalled to the secondary station by for example Radio Resource Control RRC signalling.

According to the invention the resource allocation message also contains an indication which may request the UE to send a report comprising a channel quality indicator CQI derived from measurement of the downlink channel quality. When a CQI report is requested the time offset is long enough for the UE to measure then channel quality in the interval between receiving the resource allocation message and the transmission using the uplink resource. This enables the CQI report to be included in the uplink transmission immediately made as a result of receiving the resource allocation message. When a CQI report is not requested the time offset is shorter. This minimises the delay between resource allocation message and uplink transmission. This is beneficial in reducing average latency and improving throughput. This latter benefit arises when the primary station selects the resources and transmission format to match the channel state, and any change in channel conditions potentially resulting in a mismatch is likely to be smaller with a smaller time offset.

Different sets of timing offset values could be configured for different UEs by higher layer signalling.

The fixed time offset between the L1/L2 control signalling and the corresponding UL resources means that the network does not have full flexibility as to when it can direct the UE to use an uplink resource. This flexibility can be regained by allowing the network to send some indication of timing offset together with the L1/L2 control information.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of radio communication and the art of transmitter power control and which may be used instead of or in addition to features already described herein.

The invention claimed is:

1. A method of operating a primary station for allocating resources for transmissions from a secondary station to the primary station, the method comprising:
   in the primary station:
      transmitting via a processor through a transmitter, to the secondary station;
         a first indication of a transmission resource for use by the secondary station, for transmitting data to the primary station, the first indication of the transmission resource including an identification of at least one property of at least one selected transmission resource out of a set of candidate transmission resources, wherein the at least one property comprises one or more of: a frequency, a modulation scheme, a coding scheme, a transmission time interval, and a combination thereof, and
         a second indication that is different than the first indication, including to indicate whether the secondary station sends a report of the downlink channel quality, using at least part of the selected transmission resource; and
      wherein a time offset of the selected transmission resource of the first indication depends on whether or not the md second indication requests a channel quality report, and
      wherein if the second indication requests a channel quality report, the time offset is sufficient to allow the second station to make a measurement of the channel quality, and wherein if the second indication does not request a channel quality report, the time offset is not sufficient to allow the secondary station to make a measurement of the channel quality.

2. A computer-readable storage-medium that is not a transient propagating wave or signal, having stored thereon instructions that when executed cause processing circuitry of a primary station to perform the method steps of claim 1.

3. A primary station comprising:
   a processor of the primary station, configured to allocate resources for transmissions from a secondary station to the primary station; and
   a transmitter of the primary station controlled by the processor, configured to transmit to the secondary station:
      a first indication of a transmission resource for use by the secondary station for transmitting data to the primary station, the first indication of the transmission resource for use by the secondary station including an identification of at least one property of at least one selected transmission resource out of a set of candidate transmission resources, wherein the at least one property comprises one or more of: a frequency, a modulation scheme, a coding scheme, a transmission time interval, and combinations thereof, and
      a second indication that is different than the first indication, to indicate whether the secondary station sends a report of the downlink channel quality using at least part of the selected transmission resource, and
      wherein a time offset of the selected transmission resource from the first indication is dependent on whether or not the second indication requests a channel quality report, and wherein if the second indication requests a channel quality report, the time offset is sufficient to allow the secondary station to make a measurement of the channel quality, and wherein fi the second indication does not request a channel quality report, the time offset is not sufficient to allow the secondary station to make a measurement of the channel quality.

4. The primary station of claim 3, wherein the determined time offset is increased, if the explicit second indication requests a channel quality report, relative to the determined time offset, when the explicit second indication does not request a channel quality report.

5. The primary station of claim 3, wherein the value of the determined timing offset is predetermined for at least one of the group of: the explicit second indication requesting a channel quality report; and the explicit second indication not requesting a channel quality report.

6. The primary station of claim 3, wherein the first indication comprises a third indication which comprises an indication of the timing offset to be applied.

7. A secondary station comprising:
a processor configured to control the operation of the secondary station,
a transmitter of the secondary station, controlled by the processor, configured to transmit to the primary station in selected resources for transmissions to a primary station; and
a receiver of the secondary station, controlled by the processor, configured to receive from the primary station:
a first indication of a transmission resource for use in transmitting data to the primary station, the first indication of the transmission resource including an identification of at least one property of at least one selected transmission resource out of a set of candidate transmission resources, wherein the at least one property comprises one or more of: a frequency, a modulation scheme, a coding scheme, a transmission time interval, and combinations thereof, and
a second indication that is different than the first indication, and which is one of multiple different signals, including: an indication of whether the secondary station sends a report of the downlink channel quality using at least part of the selected transmission resource, and
wherein a time offset of the selected transmission resource from the first indication is dependent on whether or not the second indication requests a channel quality report, and
wherein if the second indication requests a channel quality report, the time offset is sufficient to allow the secondary station to make a measurement of the channel quality, and wherein if the second indication does not request a channel quality report, the time offset is not sufficient to allow the secondary station to make a measurement of the channel quality.

8. The secondary station of claim 7, wherein the time offset is greater, if the explicit second indication requests a channel quality report, than when the explicit second indication does not request a channel quality report.

9. The secondary station of claim 7, wherein the value of the determined timing offset is predetermined for at least one of the group of: the explicit second indication requesting a channel quality report; and the explicit second indication not requesting a channel quality report.

10. The secondary station of claim 7, wherein the first indication additionally comprises a third indication which comprises an indication of the timing offset to be applied.

11. The secondary station of claim 7, wherein the processor controls the transmitter, to transmit to the primary station on the selected transmission resource for transmissions to the primary station.

12. The secondary station of claim 7, wherein the determined time offset is increased, if the explicit second indication requests a channel quality report, relative to the determined time offset when the explicit second indication does not request a channel quality report.

13. A method of operating a secondary station for receiving allocated resources for transmissions from the secondary station to the primary station, the method comprising acts of:
in the secondary station,
receiving, via a processor through a receiver, from the primary station:
a first indication of a transmission resource for use for transmitting data to the primary station, the first indication of the transmission resource includes an identification of at least one property of at least one selected transmission resource out of a set of candidate transmission resources, wherein the at least one property comprises one or more of: a frequency, a modulation scheme, a coding scheme, a transmission time interval, and combinations thereof, and
a second indication that is different than the first indication, and which is one of multiple different signals including: an indication of whether the secondary station sends a report of the downlink channel quality using at least part of the selected transmission resource, and
wherein a time offset of the selected transmission resource depends on whether or not the second indication requests a channel quality report, and
wherein if the second indication requests a channel quality report, the time offset is sufficient to allow the secondary station to make a measurement of the channel quality, and wherein if the second indication does not request a channel quality report, the time offset is not sufficient to allow the secondary station to make a measurement of the channel quality.

14. The method of operating a secondary station of claim 13, comprising: transmitting, via the processor through a transmitter, to the primary station on the selected transmission resources for transmissions to the primary station.

15. A computer-readable storage-medium that is not a transient propagating wave or signal, having instructions stored thereon instructions that when executed cause processing circuitry of a secondary station to perform the method steps of claim 13.

16. A method for operating a primary station for allocating resources to a secondary station for transmissions from the secondary station to the primary station, wherein:
in a primary station;
transmitting a first indication of a transmission resource via a transmitter, from the primary station to a secondary station for use by the secondary station for transmitting data to the primary station, wherein the first indication of the transmission resource indicates at least one selected transmission resource out of a set of transmission resources,
transmitting a second indication of a transmission resource that is different than the first indication, and when the second indication requests that the secondary station sends a report of the downlink channel quality using at least part of the selected transmission resource, then a time offset of the selected transmission resource from the first indication, depends on whether the second indication requests a channel quality report, wherein the time offset is greater if the second indication requests a channel quality report than when it does not, and when the second indication requests a channel quality report, the time offset is sufficient for the secondary station to make a measurement of the channel quality, and when the second indication does not request a channel quality report, the time offset is not sufficient for the secondary station to make a measurement of the channel quality.

17. The method of claim 16, wherein at least one of: the time offset when the second indication requests a quality report, or the time offset when the second indication does not request a quality report, is predetermined.

18. The method of claim 16, wherein the first indication comprises a third indication of the timing offset to be applied.

19. The method of claim 16, wherein the offset time is a period from the transmission of the first indication to the secondary station, until a time to receive a response from the secondary station according to the resource.

* * * * *